United States Patent [19]
Wilmarth

[11] 4,295,078
[45] Oct. 13, 1981

[54] COLOR TELEVISION RECEIVER DEGAUSSING CIRCUIT

[75] Inventor: Paul C. Wilmarth, Noblesville, Ind.
[73] Assignee: RCA Corporation, New York, N.Y.
[21] Appl. No.: 148,088
[22] Filed: May 12, 1980
[51] Int. Cl.³ .............................................. H04N 9/29
[52] U.S. Cl. .................................... 315/8; 361/150
[58] Field of Search ............... 315/8, 85; 361/150, 361/267; 358/194

[56] References Cited
U.S. PATENT DOCUMENTS 3,439,211  4/1969  Cassagne et al. ................... 315/8
3,733,524  5/1973  Cooksey et al. .................. 361/150
3,784,868  1/1974  Shinkai et al. ..................... 315/8

Primary Examiner—Eugene R. La Roche
Attorney, Agent, or Firm—Paul J. Rasmussen; William H. Meagher; Joseph Laks

[57] ABSTRACT

In a remote controlled color television receiver, the television receiver power supply is responsive to the state of an on/off command signal. A DC supply voltage is applied to an input terminal of the power supply during both states of the on/off command signal, with the power supply developing an operating voltage at an output terminal only during the on-state of the command signal. A relay type switch is coupled to a degaussing winding and a source of alternating polarity voltage. The switch is responsive to the presence of the operating voltage and applies the alternating polarity voltage to the degaussing winding to generate degaussing current during the occurrence of, illustratively, the on-state of the command signal.

13 Claims, 1 Drawing Figure

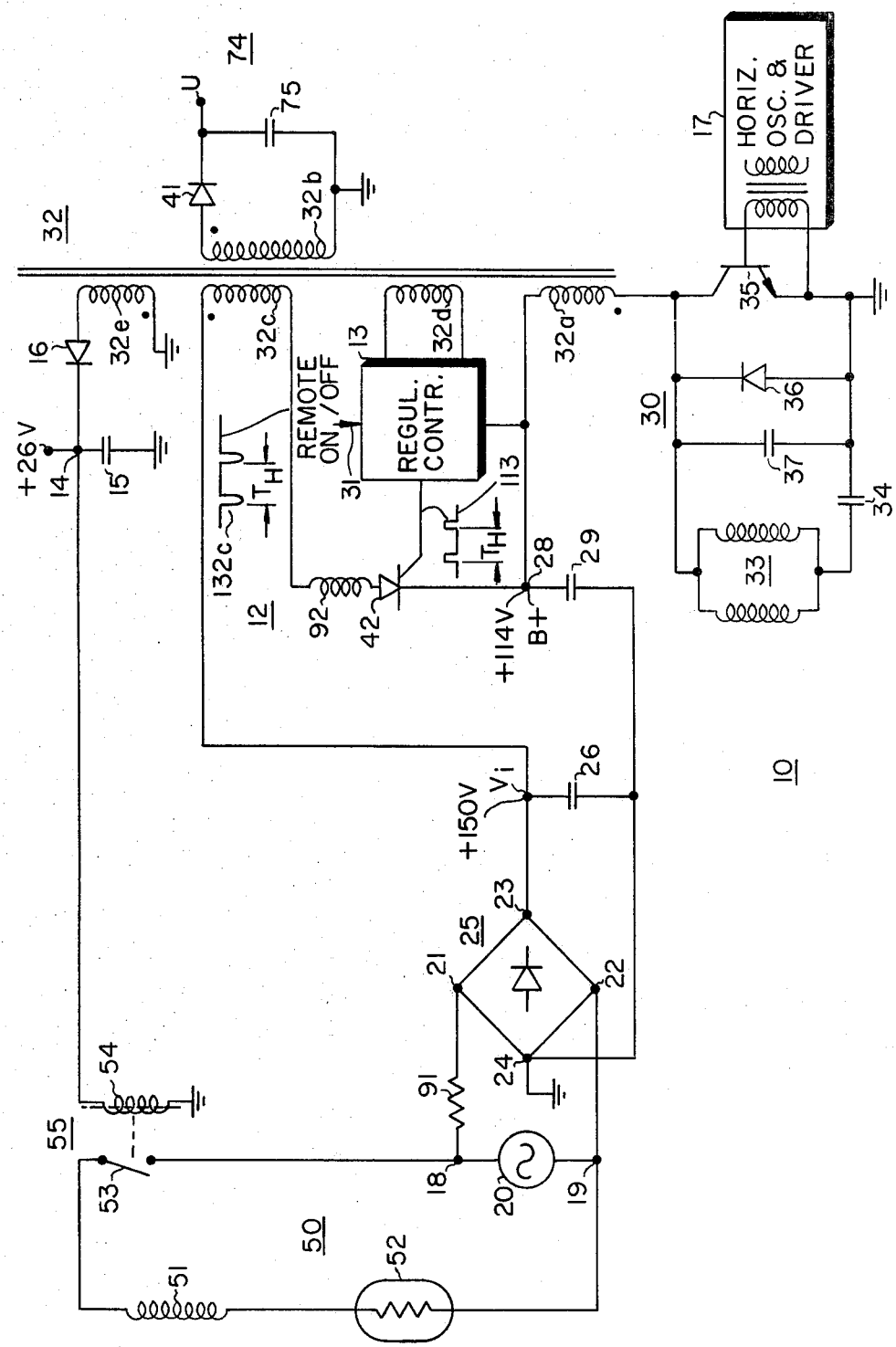

COLOR TELEVISION RECEIVER DEGAUSSING CIRCUIT

This invention relates to color television degaussing circuits.

To maintain color purity in a color television receiver, magnetic fields, other than those produced by the neck components of the color picture tube, must be neutralized. The undesirable fields may be produced by external factors, such as the presence of the earth's magnetic field, operation of transformers and motors, or by undesirable magnetization of color television receiver components such as the shadow mask and support housing. A magnetic shield is typically provided to shield the electron beams within the color television receiver picture tube from such external magnetic fields.

When turning on the television receiver, an automatic degaussing circuit develops a degaussing magnetic flux to degauss the magnetic shield and other magnetizable color television receiver components. A degaussing winding is arranged in series with the AC power line source and the television receiver mechanical on/off switch. When the on/off switch is placed in the on position, the AC source voltage is applied across the degaussing network to produce an alternating current in the degaussing winding. A thermistor in series with the degaussing winding causes the degaussing current to decay in amplitude as the thermistor heats up.

In some remote controlled television receivers, the television receiver on/off function is provided by a main power supply regulator which is responsive to remote on/off command signals. When a turn-off command signal is received, the regulator removes operative voltage that powers some of the television receiver circuits needed to provide picture and sound, thereby effectively turning off the television receiver. When receiving a turn-on command signal, the regulator begins to supply the operative voltage, thereby effectively turning on the television receiver.

Television receivers which use remote-responsive power supplies for receiver turn-on and turn-off may have the AC power line source directly connected to the power supply rectifier elements both in the on and in the off-state of the television receiver. A feature of the invention is to provide automatic degaussing of a remote controlled color television receiver which does not have a mechanical on/off switch. The on/off capability of the remote-responsive power supply, in an embodiment of the invention, is used to control a switch which is coupled to the degaussing winding and the source of alternating polarity voltage. The switch applies the alternating polarity voltage to the degaussing winding to generate degaussing current during the occurrence of one of the on and off-states of the command signal.

In a specific embodiment, the switch comprises a degaussing electromechanical relay. Current for the relay coil is generated by a DC voltage applied thereto. This DC voltage is derived by rectifying the retrace pulse voltage developed across a flyback transformer secondary winding. Thus, when the remote-responsive power supply receives a turn-on command signal and generates a B+ supply voltage for the deflection generator, retrace pulse voltages are developed. The relay coil, responsive to the presence of these retrace pulse voltages, actuates the mechanical switch portion of the degaussing relay. Degaussing current flows through the degaussing winding from the source of alternating polarity voltage, providing the required degaussing action. A thermistor in series with the degaussing winding heats up and causes an amplitude decay of the degaussing current.

To disconnect the degaussing winding from the source of alternating polarity voltage, the mechanical switch portion of the degaussing relay opens upon television receiver turn-off. When the remote-responsive power supply receives a turn-off command signal, operative B+ power is removed from the deflection generator, resulting in the loss of retrace pulse voltage and the deenergization of the degaussing relay coil, thereby opening the mechanical switch portion of the relay. With degaussing current no longer flowing, the thermistor cools down, thereby enabling degaussing action to be initiated upon subsequent television receiver turn-on.

The FIGURE illustrates a color television receiver power supply and deflection circuit including a degaussing arrangement embodying the invention.

In the deflection and power supply circuit 10, illustrated in the FIGURE, a source 20 of alternating polarity voltage, such as the AC power line or mains supply voltage, is coupled across terminals 18 and 19. Terminal 18 is coupled through a resistor 91 to an input terminal 21 of a full-wave bridge rectifier 25. Terminal 19 is directly coupled to another input terminal 22. A filter capacitor 26 is coupled across output terminals 23 and 24 of rectifier 25 with terminal 24 functioning as a ground or common current return terminal. A filtered but unregulated DC input voltage $V_i$ is developed across filter capacitor 26.

The input voltage $V_i$ is applied to a winding 32c of a horizontal output or flyback transformer 32. Flyback transformer winding 32c is part of a switching regulator and main power supply 12 which includes an inductor 92 and a series pass semiconductor switch, SCR 42. SCR 42 is gated into conduction each horizontal trace interval by gating pulses 113 developed within a regulator control circuit 13. When SCR 42 is gated into conduction, current flows from terminal 23 through SCR 42 to an input terminal 28, at which terminal a regulated B+ operating voltage is developed. A horizontal rate ripple filter capacitor 29 is coupled between input terminal 28 and ground terminal 24.

The controllable switch, SCR 42, is commutated off during the horizontal retrace interval by a negative horizontal retrace pulse 132c developed by flyback transformer winding 32c. Synchronization with horizontal deflection is attained by coupling a flyback transformer secondary winding 32d to regulator control circuit 13. To achieve regulation, the turn-on instant of SCR 42 is varied within the horizontal trace interval in response to a feedback of the B+ voltage to the regulator control circuit 13.

The B+ voltage developed at input terminal 28 is applied to a first terminal of an input or primary winding 32a of flyback transformer 32. The series arrangement of a horizontal deflection winding 33 and a trace capacitor 34 is coupled between the other terminal of primary winding 32a and ground. A horizontal deflection generator 30 including a horizontal output transistor 35, a damper diode 36, and a retrace capacitor 37, is coupled to horizontal deflection winding 33 to generate scanning current in the deflection winding. A horizontal oscillator and driver 17 switches horizontal output transistor 35 into and out of conduction each horizontal deflection cycle in order to generate scanning current in the deflection winding.

A high voltage power supply 74 provides an ultor accelerating potential at a terminal U. A diode 41 rectifies the retrace pulse voltage developed across a high voltage winding 32b of flyback transformer 32, and a capacitor 75 filters the rectified voltage to provide the ultor accelerating potential.

Another flyback transformer winding such as output or secondary winding 32e provides an auxiliary DC power supply voltage, illustratively +26 volts DC, for such circuits as the vertical deflection circuit and the audio circuit. The deflection rate retrace pulse voltage developed across secondary winding 32e is rectified by a diode 16 and filtered by a capacitor 15 to develop the +26 volt DC supply voltage at a terminal 14. Other secondary windings, not illustrated, may provide additional auxiliary power supply voltages for such circuits as the horizontal driver stage and the video circuit.

With the auxiliary DC supplies deriving their supply voltages by rectifying the voltages developed across the various secondary windings of flyback transformer 32, operative power for many of the television receiver circuits is ultimately derived from power supply switching regulator 12, which generates the B+ voltage at terminal 28. When the B+ voltage is absent, deflection generator 30 cannot be energized and pulse voltages cannot be developed across the flyback transformer windings for use by the auxiliary power supplies.

Turn-on and turn-off the television receiver may, therefore, be controlled by applying an on/off command signal to regulator control circuit 13 along a conductor line 31. Such an on/off command signal may be generated by conventional remote control television receiver circuitry, not illustrated. Regulator control circuit 13 may be similar to the circuit disclosed in the U.S. Patent Application of D. H. Willis, Ser. No. 080,839, filed October 1, 1979, entitled "HIGH VOLTAGE DISABLING CIRCUIT FOR A TELEVISION RECEIVER", hereby incorporated by reference.

With the television receiver being turned on and off by the command signals applied to regulator control circuit 13, no mechanical on/off switch is required to be coupled between a terminal of AC power line source 20 and an input terminal of full-wave bridge rectifier 25. Bridge rectifier 25 thus applies the DC or rectified alternating power line voltage to terminal 23 even in the off-state of the television receiver. No voltage, however, is developed at input terminal 28 when the television receiver is in the off-state, because SCR 42 is not being gated into conduction. Without a B+ operating voltage at terminal 28, deflection generator 30 is deenergized, and no auxiliary supply voltages are available to power various ones of the television receiver circuits.

Upon application of a turn-on command signal along conductor line 31, gating pulses to turn on SCR 42 are developed by regulator control circuit 13. B+ voltage is then developed at terminal 28 after initiation of the on-state and retrace pulse voltages are developed across the flyback transformer windings including the retrace pulse output voltage signal across output secondary winding 32e.

A degaussing network 50 comprises a degaussing winding 51, a thermistor 52, and a switching arrangement comprising an electromechanical relay 55 including a relay coil 54 which actuates the mechanical switch portion 53 of the relay. The degaussing winding 51 is series coupled with thermistor 52 and the mechanical switch portion 53 of relay 55 across the source of alternating polarity voltage 20 at terminals 18 and 19. Relay coil 54 is coupled to the flyback-derived +26 volt source at terminal 14 and is thus subject to energization by current flowing from terminal 14 in response to application by deflection generator 30 of the deflection rate, $1/T_H$, retrace pulse voltage to flyback transformer primary winding 32a.

To initiate degaussing action, a turn-on command signal is applied to regulator control circuit 13 along conductor line 31. SCR 42 begins switching conductive states to develop the B+ operating voltage at terminal 28, thereby energizing deflection generator 30 to develop retrace pulse voltages at the collector of horizontal output transistor 35. Deflection rate retrace pulse voltages are then developed in flyback secondary winding 32e to develop the +26 volts DC at terminal 14. Current from terminal 14 flows in relay coil 54, thereby actuating mechanical switch portion 53 to switch to the closed or conductive state.

With switch portion 53 closed, the alternating polarity voltage of source 20 is applied across the series arrangement of degaussing winding 51 and thermistor 52. An alternating degaussing current flows through degaussing winding 51 and thermistor 52. The degaussing current generates an alternating polarity degaussing magnetic flux as required to degauss the various metallic components of the color television receiver. Thermistor 52 then heats up due to the degaussing current flowing through it, resulting in an amplitude decay of the degaussing current as the thermistor resistance increases. Degaussing is completed when the thermistor heats up and attains its maximum resistance, resulting in only a trickle current flowing through degaussing winding 51.

To enable degaussing action to be initiated when subsequently turning on the television receiver, degaussing winding 51 and thermistor 52 must be decoupled from source 20 to permit the thermistor to cool. When a turn-off command signal is applied to regulator control circuit 13 along conductor line 31, switching action of SCR 42 is stopped, and the B+ operating voltage at terminal 28 is removed, thereby removing the retrace pulse voltage from across secondary winding 32e. The +26 volts at terminal 14 is no longer developed, and current no longer flows in relay coil 54, deenergizing the coil. With coil 54 deenergized, mechanical switch portion 53 switches to the open, nonconductive state, decoupling degaussing winding 51 and thermistor 52 from source 20 and removing the alternating polarity voltage from across the series arranged degaussing winding and thermistor. The trickle current in degaussing winding 51 and thermistor 52 no longer flows, and thermistor 52 is thus permitted to cool down. Subsequent degaussing action can therefore occur when another turn-on command signal is received by the remote-responsive power supply 12.

The presence or absence of a flyback pulse voltage is thus used as a signal for the degaussing network 50 to respectively initiate degaussing action or to initiate thermistor cool-down.

Using a remote-responsive power supply 12, as illustrated in the FIGURE, wherein the switching regulator functions to provide receiver turn-on and turn-off, the switch portion of relay 55 is in circuit only with the degaussing winding 51 and only degaussing current flows through mechanical switch 53. A relatively small and inexpensive electromechanical relay may be used as part of the degaussing network 50. In contrast, in typical conventional remote controlled color television receivers, an electromechanical relay is used to also provide a main B+ power supply on/off function. Thus, the mechanical portion of the relay in a conventional remote arrangement must be sufficiently robust to permit a relatively large initial inrush current to flow through the relay mechanical switch portion to charge the main B+ filter capacitor, such as capacitor 26, and to permit the steady-state currents to flow which supply power to the television receiver.

What is claimed is:

1. A degaussing arrangement, comprising:
   a source of alternating polarity voltage;
   a power supply coupled to said source for developing a supply voltage from said alternating polarity voltage;
   a deflection generator coupled to said power supply and being energized by said supply voltage to develop a deflection rate voltage;
   a transformer including first and second windings, said deflection rate voltage being applied to said first winding;
   a degaussing winding; and
   a relay including a coil coupled to said transformer second winding and subject to energization in response to application of said deflection rate voltage to said first winding and including switching means actuated by said coil energization for coupling said degaussing winding to said source of alternating polarity voltage to permit the flow of degaussing current.

2. An arrangement according to claim 1 wherein said switching means when in a first conductive state applies said alternating polarity voltage to said degaussing winding to generate said degaussing current and when in a second conductive state removes said alternating polarity voltage from said degaussing winding.

3. An arrangement according to claim 2 wherein said coil switches said switching means to said first conductive state when said deflection rate voltage is applied to said first winding and switches said switching means to said second conductive state when said deflection rate voltage is removed from said first winding.

4. An arrangement according to claim 3 wherein said transformer comprises a horizontal output transformer and said deflection rate voltage comprises a flyback pulse voltage.

5. An arrangement according to claim 4 including a thermistor series coupled with said degaussing winding and said switching means across said source of alternating polarity voltage.

6. An arrangement according to claims 1 or 5 wherein said power supply is responsive to the state of a remote control on/off command signal to energize said deflection generator in the on-state of said command signal and to deenergize said deflection generator in the off-state.

7. A degaussing circuit for a color television with a remote controlled power supply, comprising:
   a source of DC supply voltage;
   a power supply responsive to the state of an on/off command signal;
   means for applying said DC supply voltage to an input terminal of said power supply during both states of said on/off command signal, said power supply developing an operating voltage at an output terminal only during the on-state of said command signal;
   a source of alternating polarity voltage;
   a degaussing winding; and
   switching means coupled to said degaussing winding and said source of alternating polarity voltage and responsive to the presence of said operating voltage for applying said alternating polarity voltage to said degaussing winding to generate degaussing current during the occurrence of one and only one of the on and off-states of said command signal.

8. A degaussing circuit according to claim 7 including a transformer, means responsive to said operating voltage for developing an output signal across an output winding of said transformer and means for applying said output signal to said switching means to switch conductive states of said switching means.

9. A degaussing circuit according to claim 8 wherein said transformer comprises a flyback transformer and wherein said output signal developing means comprises a deflection generator.

10. A degaussing circuit according to claim 9 including rectifying means coupled to said source of alternating polarity voltage for developing said DC supply voltage at an output terminal of said rectifying means.

11. A degaussing circuit according to claim 10 wherein said switching means comprises an electromechanical relay including a mechanical switch and a relay coil actuating said mechanical switch, said coil being coupled to said output winding and subject to energization in response to the development of said output signal across said output winding.

12. A degaussing circuit according to claim 11 including a thermistor series coupled with said degaussing winding and said mechanical switch across said source of alternating polarity voltge.

13. A degaussing circuit according to claims 7 or 12 wherein said power supply comprises a controllable switch and a control circuit for periodically turning on said controllable switch to develop said operating voltage, said control circuit responsive to said on/off command signal for maintaining said controllable switch nonconductive during the off-state of said command signal.

* * * * *